United States Patent [19]
Cooper

[11] 4,213,872
[45] Jul. 22, 1980

[54] SLUDGE RESISTANT LIQUID DEVELOPER FOR ELECTROSTATIC IMAGES CONTAINING A METAL-DITHIOOXAMIDE PIGMENT OR COATING

[75] Inventor: Robert N. Cooper, Skokie, Ill.

[73] Assignee: A. B. Dick Company, Niles, Ill.

[21] Appl. No.: 925,115

[22] Filed: Jul. 17, 1978

[51] Int. Cl.$^2$ ........ G03B 9/12
[52] U.S. Cl. ........ 430/114; 430/109; 252/62.1 P; 106/14.5; 427/218; 427/220; 428/403
[58] Field of Search ........ 252/62.1; 96/1 SD; 260/439 R; 106/20, 14.5; 427/17, 218; 428/403

[56] References Cited

U.S. PATENT DOCUMENTS 4,111,702 9/1978 Fraik ........ 106/14.5

*Primary Examiner*—John D. Welsh
*Attorney, Agent, or Firm*—McDougall, Hersh & Scott

[57] ABSTRACT

A liquid developer composition for visual development of latent electrostatic images in which the pigment particles dispersed in the liquid carrier is a metal-dithiooxamide product or a pigment coated with said metal-dithiooxamide reaction product whereby the liquid developer composition is relatively free of sludging.

7 Claims, No Drawings

SLUDGE RESISTANT LIQUID DEVELOPER FOR ELECTROSTATIC IMAGES CONTAINING A METAL-DITHIOOXAMIDE PIGMENT OR COATING

This invention relates to the production of copies by electrophotographic technique and it relates more particularly to a liquid developer for use in the practice of same.

Processes are well known for forming a latent electrostatic image, existing as an electrostatic charge pattern on a layer of material having high resistance, and for subsequently converting the latent electrostatic image to a visual pattern.

In one such process, an optical image is produced directly on a film or coating containing a photoconductive pigment, such as zinc oxide dispersed in an insulating matrix, such as a synthetic resin. The coating may be provided on a suitable substrate, such as a flexible sheet of paper, metal or other electrically conductive backing. In this process, the photoelectrostatic coating is given an overall electrostatic charge while being protected from light. Thereafter, it is exposed to a light image of the subject to be reproduced. The electrostatic charge on the coating is dispersed in the areas struck by light and retained in the unexposed areas, thereby to provide an electrostatic reproduction of the optical image. This latent electrostatic image is then converted to a visible image by a developing composition containing toner particles which are attracted to the latent electrostatic image and fixed, as by heat, solvent vapors or the like.

In a plain paper copier, known as the Xerox process, after treatment of the latent electrostatic image with the developer, the toner particles are transferred from the electrophotographic layer (selenium) onto a copy sheet on which the developed image is fixed, as by heat, solvent vapors or the like, as described above.

As described in U.S. Pat. Nos. 2,996,573 and 3,075,859, a latent electrostatic image capable of visual development by means of a developer composition of the type described can be provided on a suitable substrate having a dielectric coating.

The latent electrostatic images of the type described can be developed in a number of ways, such as by cascade development with a dry powdered developer composition, as described in U.S. Pat. No. 2,221,726, or by magnetic brush development with a dry powdered developer composition, as described in U.S. Pat. No. 3,084,043, or by a liquid developer composition to which this invention is addressed.

Liquid developer compositions for use with electrostatic images comprise a dispersion of a pigment or toner particles in a volatile liquid having a high dielectric strength and a high volume resistivity. The dispersed particles may carry either a positive charge or a negative electrical charge, depending on their chemical composition for either negative toning or positive toning respectively. The non-conductivity and the high dielectric strength of the volatile liquid in the liquid developing composition preserves the electrostatic image and permits the deposition of the dispersed toner particles to form a visible image. Liquid toners are described in the Metcalfe U.S. Pat. No. 2,907,674, the Straughan U.S. Pat. No. 2,899,335, the Mayer et al. U.S. Pat. No. 2,890,911, the York U.S. Pat. No. 3,135,095, the Dirks U.S. Pat. No. 3,155,546 and the Zabiak U.S. Pat. No. 3,535,244 and many others.

One of the problems encountered in the use of liquid developers is the tendency for the toner particles to settle in the developer composition, a characteristic generally referred to in the trade as "sludging".

Attempts have been made to overcome sludging by formulation of the liquid developer system with gel structures, which are very delicate, or by formulation of the liquid developer with a viscosity high enough to minimize settling of the toner particles. However, such systems yield copies of poor quality due to reduced particle mobility.

It is an object of this invention to produce and to provide a method for producing liquid developer compositions for visual development of latent electrostatic images whereby the problem of sludging is greatly minimized, if not eliminated, without interfering with the desired mobility of the toner particles whereby copy of good quality can be produced.

In accordance with the practice of this invention, a stable liquid developer composition is prepared when use is made of toner particles formulated of the reaction product of ions of a metal selected from the group consisting of copper, cobalt and iron and preferably nickel with a dithiooxamide or derivative thereof in accordance with the following equation:

$$M^{++} + NH_2CSCSNH_2 \longrightarrow$$

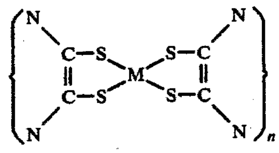

in which n is any number and M is nickel, cobalt, copper or iron supplied in the form of a compound, such as nickel octoate. The reaction can be carried out at room temperature or above with the dithiooxamide or derivative dissolved in a suitable solvent such as acetone, or butyl Cellosolve (a trademark of Union Carbide Corporation for ethylene glycol monobutyl ether).

The metal-dithiooxamide, in finely divided form, is itself capable of being highly charged and is settlement resistant thereby to enable use alone as highly colored toner particles in a suitable liquid carrier, such as isoparaffinic liquid. It has also been found that combinations of such metal-dithiooxamide reaction products with other pigments, such as carbon black, become settlement resistant when the reaction to form the metal-dithiooxamide is carried out in situ in the presence of such other pigment particles. It is believed that the reaction product forms on such other pigment particles whereby they also become settlement resistant and thus can be used in the formulation of sludge-free liquid toner compositions.

The following examples are given by way of illustration, but not by way of limitation, of the preparation of liquid toner compositions and toner particles employed therein in accordance with the practice of this invention.

EXAMPLE 1

This example describes the preparation of toner particles formed of the metal-dithiooxamide alone.

Part A

Dithiooxamide: 15.8 parts by weight
Staybelite: 15.8 parts by weight
butyl Cellosolve: 167.5 parts by weight Part B 10% solution of Nickel Octoate—78.9 parts by weight Procedure Parts A and B are milled together for three hours at room temperature in a ball mill or roller mill. The milled product is filtered and the filter cake is washed with the same solvent (butyl Cellosolve) dried in an oven and ground to a powder.

The reaction product, having a dark blue color, is taken up in isoparaffinic solvent at a concentration of about 2-20 parts by weight per 100 parts by weight of solvent, preferably containing a solution of resinous binder in an amount of about 130 parts by weight of binder per 30 parts by weight pigment, and then the concentrate is milled to reduce the particle size of the toner to 5 microns or less.

For use in the development of latent electrostatic images, the above concentrate is diluted with the same or similar solvent added in an amount to dilute 60 grams of the concentrate to a volume of 3 liters.

EXAMPLE 2

This sample illustrates the preparation of toner particles formed of carbon black and the metal-dithiooxamide.

Part A

Dithiooxamide: 15.8 parts by weight
Staybelite: 15.8 parts by weight
butyl Cellosolve: 675.5 parts by weight Part B 10% solution of Nickel Octoate—78.9 parts by weight
Carbon Black (Molacco Black)—23.7 parts by weight The procedure for the preparation of the developer composition is the same as that of Example 1. By reason of the presence of carbon black, the toner is black instead of blue.

As the liquid carrier or diluent, use can be made of one or more low boiling aliphatic solvents having a high volume resistivity, for example $10^{10}$ ohms-cm, so as to avoid dissipation of charge from the electrostatic image. Such aliphatic solvents, as represented by isopentane, octane and cyclohexane, serve also to avoid attack on the binder present in the photoconductive coating. With the non-settling toner particles of the invention. Best use is made of an isoparaffinic solvent such as Isopar G as marketed by Exxon Company in the United States, having a flash point of about 104° F. and a KB value of about 27.

The Staybelite functions in the composition in conjunction with other charge directors to give polarity in the pigment particles. While not necessary, the Staybelite can be replaced, in whole or in part, with other charge directors, such as fatty acid soaps of zirconium, manganese and cobalt, such as the corresponding metal octoates, resinates, or neodecanoates.

The binder component in Examples 1 and 2 may be selected of polymeric materials which are soluble in the carrier solvent, such as methacrylate or other alkylacrylate resins such as lauryl methacrylate, isobutyl methacrylate, methyl or other alkyl ester of rosin, such as marketed by Hercules Chemical Company under its trade name Hercolyn, pentaerythritol esters of rosin, such as marketed under the trade name Pentalyn H. The amount of binder is not significant. When used, the binder concentration can range from 1-10 parts by weight of binder per part by weight of pigment.

The following is a further example of the concentrate representative of the practice of this invention:

EXAMPLE 3

200 parts by weight Isopar G
28 parts by weight paraffin oil
200 parts by weight pigment suspension of Example 1
25 parts by weight methylmethacrylate polymer
70 parts by weight zirconium neodecanoate In use, the surface containing the latent electrostatic image is wet with the liquid developing composition, either by immersion of the sheet in a path of developing composition, or by flow coating the composition over the imaged surface, or by application of the liquid developing composition onto the imaged coating by means of a roller coater or the like. The sheet wet with the developing composition is advanced through a squeeze roll to remove excess liquid and the toner particles are attracted to the latent electrostatic image for visual development of the image.

When the image is developed on the copy sheet, the sheet is advanced through a fusion zone for fixing the image on the sheet. When in a plain paper copier, a copy sheet is brought into contact with the surface of the selenium drum, after image development, for transfer of the toner particles of the developed image from the drum to the copy sheet, on which it is subsequently fixed as by heat or the like.

The term "dithiooxamide", as used herein, includes derivatives thereof as represented by:

N,N-Bis(3-dimethylaminopropyl) dithiooxamide
N,N-Bis(3-hydroxyethyl) dithiooxamide
N,N-Bis(carboxymethyl) dithiooxamide
N,N-diallyldithiooxamide
N,N-di-sec. butyldithiooxamide
N,N-di-R-dithiooxamide in which R is ethyl, propyl, pentyl, octyl, octadecyl, etc.

It will be understood that changes may be made from the standpoint of the reaction and materials without departing from the spirit of the invention, especially as defined in the following claims.

I claim:

1. A liquid developer composition for visual development of latent electrostatic images comprising an inert liquid carrier and a compound having the general formula

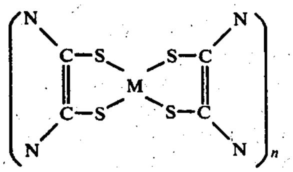

in which M is a metal selected from the group consisting of nickel, cobalt, copper and iron and n is a whole number in which the compound in finely divided form is dispersed as a toner or part thereof in the carrier in an amount within the range of 2-20 parts by weight per 100 parts by weight of liquid carrier.

2. A liquid developer as claimed in claim 1 in which the toner particles dispersed in the liquid carrier comprise finely divided pigment particles in which the compound is present as a coating on the pigment particles formed in situ in the presence of the pigment particles.

3. A liquid developer as claimed in claim 1 in which the liquid carrier is a low boiling aliphatic hydrocarbon having a volume resistivity in excess of $10^{10}$ ohms-cm.

4. A liquid developer as claimed in claim 1 which includes an organic high molecular weight binder which is soluble in the liquid carrier.

5. A liquid developer as claimed in claim 1 in which the liquid carrier is an isoparaffinic solvent.

6. Non settling toner particles in finely divided form for dispersion in a liquid carrier to form a liquid composition for development of latent electrostatic images comprising a pigment in finely divided form and a coating on the pigment particles of a compound having the general formula

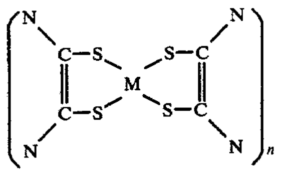

in which M is a metal selected from the group consisting of nickel, cobalt, copper and iron and n is a whole number, formed by reaction in situ in the presence of the pigment particles.

7. The method of forming toner particles as claimed in claim 6 comprising reacting in substantially equal molecular proportions a compound of a metal soluble in the liquid carrier, in which the metal is selected from the group consisting of nickel, cobalt, copper and iron and mixtures thereof, in the presence of the pigment particles while suspended in a liquid carrier.

* * * * *